UNITED STATES PATENT OFFICE.

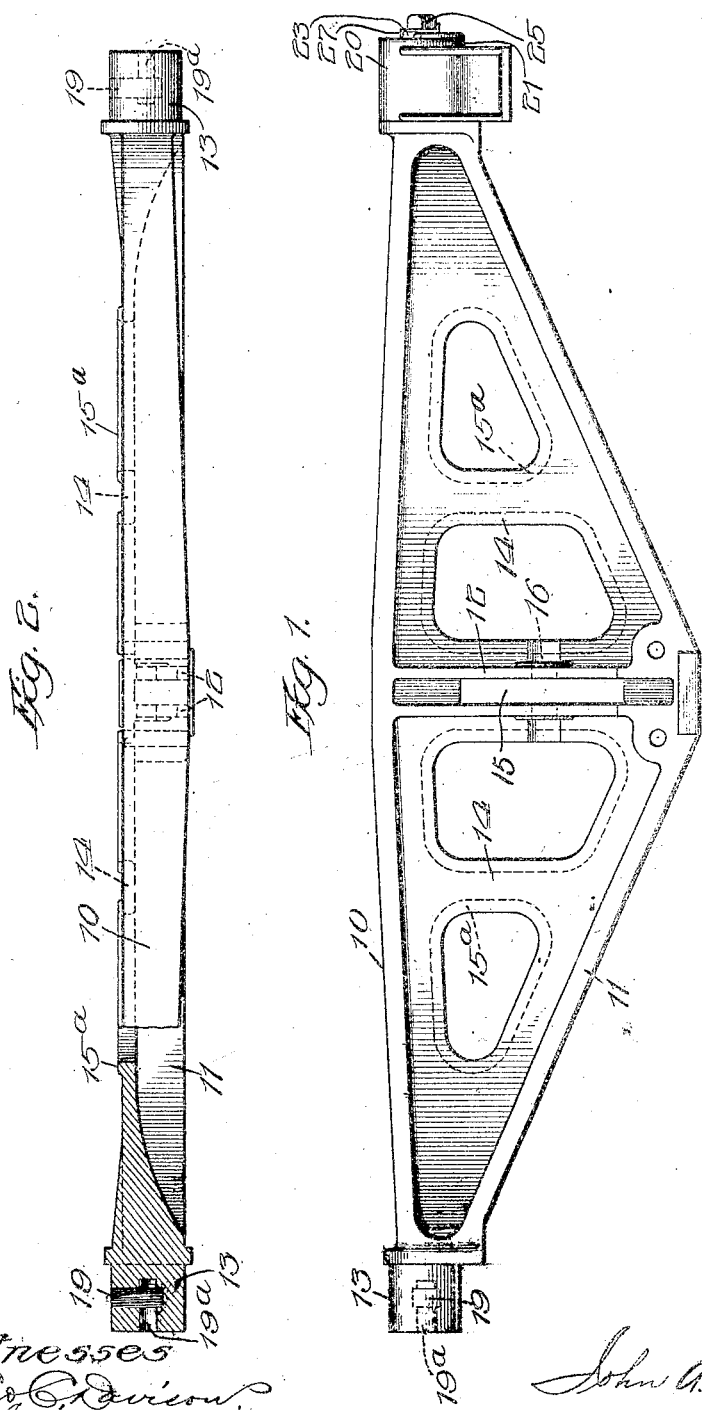

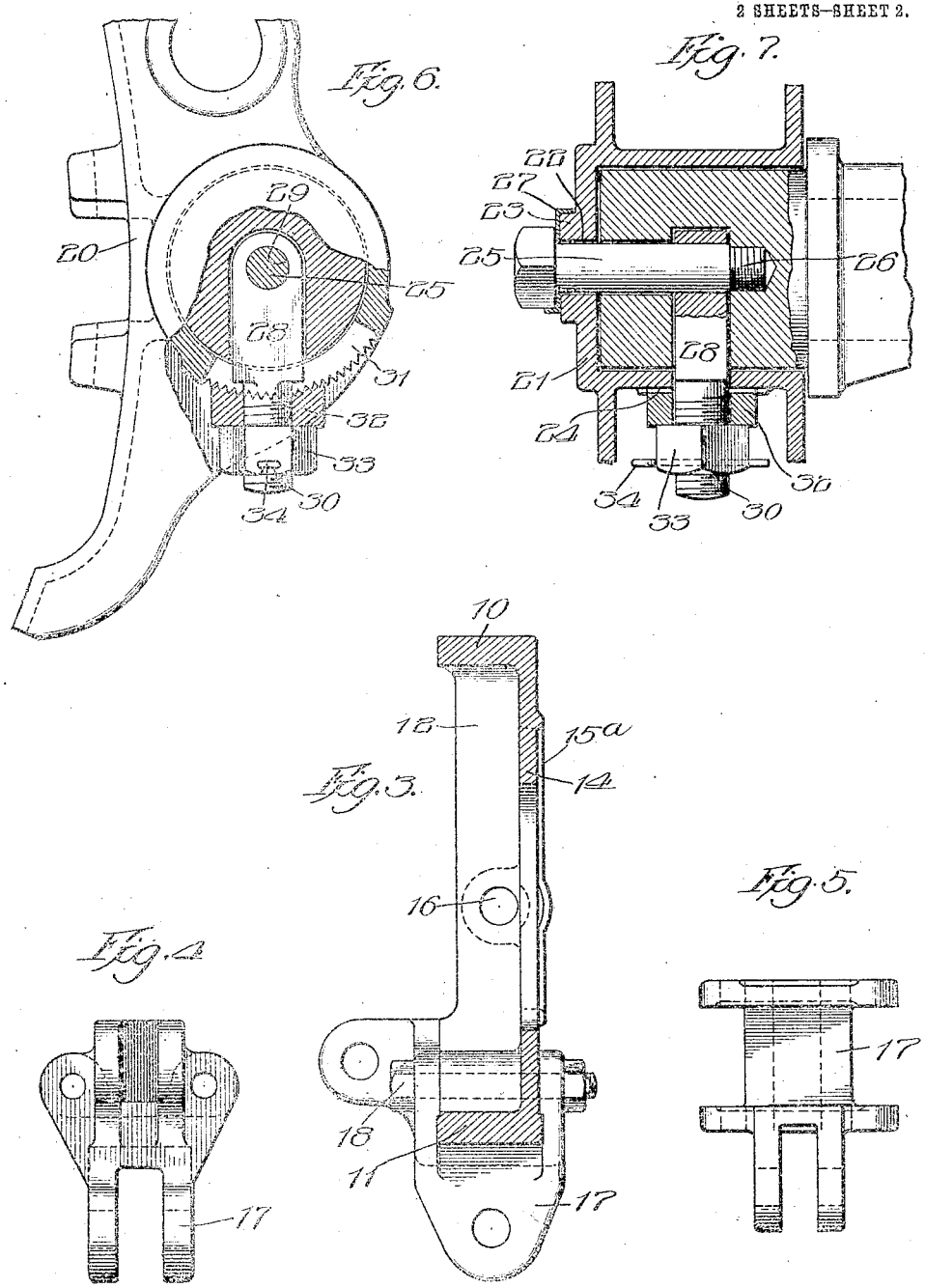

JOHN A. LAMONT, OF ST. LOUIS, MISSOURI, ASSIGNOR TO AMERICAN STEEL FOUNDRIES, OF CHICAGO, ILLINOIS, A CORPORATION OF NEW JERSEY.

BRAKE-BEAM.

974,283.  Specification of Letters Patent.  Patented Nov. 1, 1910.

Application filed May 31, 1910. Serial No. 564,335.

*To all whom it may concern:*

Be it known that I, JOHN A. LAMONT, of the city of St. Louis and State of Missouri, have invented certain new and useful Improvements in Brake-Beams, of which the following is a specification.

My invention relates to brake beams of the type wherein the members are all cast in a single piece and has particular reference to a beam of this character, provided with brake heads which may be adjustably secured therein.

As is well known, it is desirable in the use of brake beams on high speed trains that there should be as little deflection in the beam as it is possible to secure. This will be readily understood from the fact that the motion from the brake beam to the air brake cylinder is greatly multiplied and that a slight deflection in the beam will require a much greater movement at the air brake cylinder.

Therefore one of the principal objects of the present invention is to secure a brake beam of maximum stiffness and minimum weight for the strength produced.

It is also well known that in the application of inside hung beams, there is a limited available space, and in order to secure a beam of the requisite stiffness, the parts must be quite heavy and cumbersome at the ends and the space is often so limited that it is impossible to give the members their desirable thickness. To that end I have constructed my brake beam of cast metal, and so proportioned the parts that the requisite stiffness is secured in a limited amount of space.

I am aware that one piece cast brake beams are not new with my invention, but believe myself to be the first to provide a design of one piece brake beam which may be manufactured of cast steel and in channel form, that is, a trussed brake beam having its compression member, tension member, middle support and ends all cast integral and united at different points between its ends by a web, which lies in a plane of one side only of the compression and tension members.

In high speed beams of this character, it is also essential to provide a brake head which may be adjusted on the beam in order that it may be fitted to the periphery of the wheel at whatever height the beam is hung, and I have shown a form of adjustable head which I consider to be simple and efficient and which is particularly adapted for application to a beam of this construction.

My invention will be more readily understood by reference to the accompanying drawings, wherein, Figure 1 is a plan view of my improved brake beam; Fig. 2 is a side elevation thereof, showing one of the ends in section; Fig. 3 is a section through the center of the beam showing my improved suspension lug secured thereto; Figs. 4 and 5 are views of the said suspension lug; Fig. 6 is an end elevation of the brake beam and adjustable brake head, part of the head being broken away to show the mechanism, and, Fig. 7 is a view, partly in section, showing more clearly the brake head securing means.

My improved brake beam is composed of a compression member, 10, tension member, 11, and middle support, or strut, 12. It is provided with cylindrical end portions, 13, and the compression and tension members are joined at points between their ends by means of webs, 14. In order to lessen the weight, I prefer to cut out portions of these webs, and around the cut-out portions I provide ribs, 15ª, as best shown in Fig. 3. Near the ends of the beam the webs, 14, increase in thickness, as shown in Fig. 2, until at the point where the compression and tension members unite, the web is of a width equal to the diameter of the cylindrical end portions, 13, thus insuring a rigid end construction.

As shown in Fig. 1, the strut, 12, is provided with the usual opening, 15, therethrough, and while the suspension lug or extension bracket may be cast integral with the remaining parts, I prefer to cast it as a separate piece, as at, 17, Figs. 3, 4 and 5. This part, 17, fits snugly into the lower end of the cast beam portion and is united thereto by means of the bolts 18. The cylindrical ends, 13, of the beam are provided with intersecting openings, 19, 19ª, the latter being concentric and the former intersecting the same at right angles, these being provided for a purpose hereinafter described. Brake heads, 20, are mounted upon these cylindrical ends or trunnions, and are of a common form. As shown, the head is provided with a cylindrical opening, 21, of a size permitting the head to rotate freely upon the trunnion, 13. The closed end of the cylindrical barrel is provided with a concentric opening, 22, and a squared boss, 23, surrounds this opening. The lower end of the cylindrical barrel is also provided with an opening, 24, at right angles to the opening, 22. A headed bolt, 25, is mounted in the concentric opening, 19ª, and its screw threaded end, 26, co-acting with the threads on the interior of the opening, secures the head upon the trunnion. A nut-lock, 27, may be employed to prevent the bolt from turning. A bolt, 28, is mounted at right angles to the bolt, 25, and its end is in the form of an eye, having the opening, 29, therethrough. This bolt is adapted to be suspended or swung from the bolt, 25, and is provided with a threaded end, 30. The outside edge, 31, of the brake head barrel is roughened or provided with teeth and the nut or locking block, 32, also provided with teeth, is mounted on the bolt, 28, and is forced into engagement with the outside of the barrel by means of the nut, 33, this nut being locked by means of the cotter, 34.

As will be seen, the head is first slipped over the cylindrical end portions, 13, of the beam, the bolt, 28, is next raised into place, the bolt, 25, being then placed and driven tight, the nut-lock securing it against rotation. The locking block, 30, is then placed on the bolt, 28, and the nut, 33, secures it tightly against the surface of the brake head. As will be seen, the head has a limited amount of motion when the locking block, 32, is loose, and may be fixed in any adjusted position with little trouble.

The brake beam as illustrated in Figs. 1 and 2, I consider to be of the most desirable form for casting in steel. As will be seen, the parts are of practically uniform cross section throughout, with the exception of the cylindrical ends, and this is particularly desirable, as will be understood by those skilled in the art of casting steel. I also consider the channel shape of the beam to be preferable for brake beams.

It will be understood many different forms of adjustable brake heads may be applied to my beam, and also that the head, as here illustrated, may be applied to other forms of brake beams, and I do not therefore limit myself to the exact constructions herein shown and described.

I claim:

1. A brake beam having a compression member, a tension member, a middle support, webs joining said compression and tension members at points between their united ends and trunnions formed at the ends of said compression and tension members, all the parts being cast in a single piece, in combination with brake heads mounted for rotation on said trunnions, means for securing said brake heads in adjusted positions, said means comprising intersecting bolts, substantially as described.

2. A brake beam comprising compression and tension members, a web uniting said compression and tension members at points between their ends, trunnions at the meeting point of said compression and tension members, the parts all being cast in a single piece, in combination with a center suspension lug secured to said integral casting, substantially as described.

3. A brake beam of the class described, of general channel shape in cross section and provided with integral trunnions at its ends, the web of said channel being provided with openings therethrough, and strengthening ribs around said openings, substantially as described.

4. A one piece brake beam provided with trunnions upon its ends, said trunnions having apertures therein, in combination with a brake head mounted for rotation upon each of said trunnions, intersecting bolts mounted within the openings in said trunnions and means whereby each of said heads is positively held against rotation, substantially as described.

5. A brake beam having trunnions upon its ends, each of said trunnions being provided with openings formed at right angles to each other, in combination with a brake head rotatably mounted upon each of said trunnions, bolts mounted in the openings of and concentric with said trunnions, said bolts being adapted to secure said heads upon said trunnions, eye-bolts mounted in the other of said openings and retained in place by the concentric bolts, toothed nuts held by said eye-bolts and adapted to co-act with the outer surface of the brake heads, and means for forcing said toothed nuts tightly against the outer surface of said brake heads, substantially as described.

6. A brake beam having integral trunnions upon its ends, said trunnions being provided with intersecting openings, in combination with adjustable brake heads mounted upon said trunnions, bolts extending through said brake heads and into said intersecting openings, and means upon the exterior of said brake heads for locking the same in adjusted positions, substantially as described.

JOHN A. LAMONT.

Witnesses:
E. B. SHERZER,
JAS. H. LOUIE.